Feb. 7, 1939.   E. A. KEELER   2,146,300
THERMAL CONDUCTIVITY GAS ANALYSIS APPARATUS
Filed March 31, 1938    2 Sheets-Sheet 1

INVENTOR.
EARL A. KEELER
BY *[signature]*
ATTORNEY.

Feb. 7, 1939.   E. A. KEELER   2,146,300
THERMAL CONDUCTIVITY GAS ANALYSIS APPARATUS
Filed March 31, 1938   2 Sheets-Sheet 2
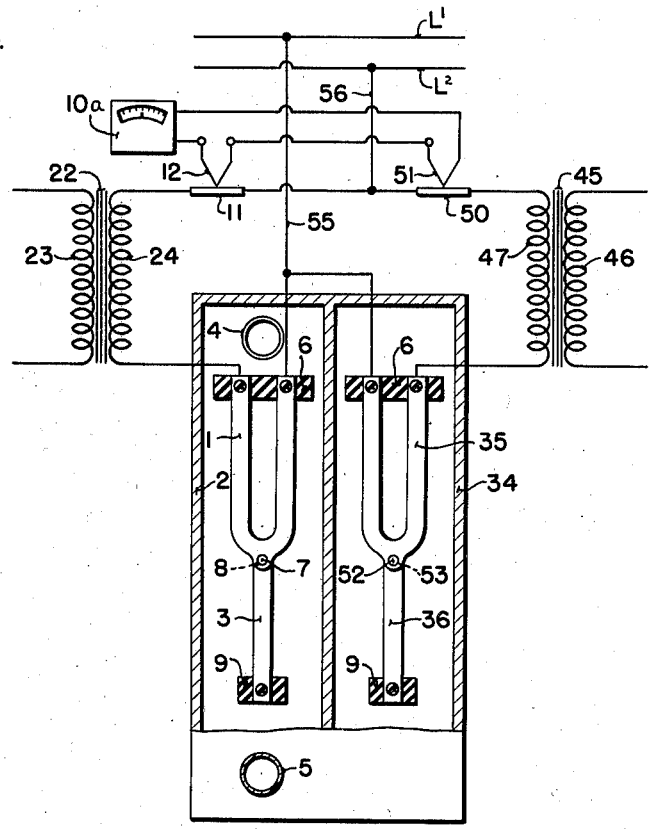
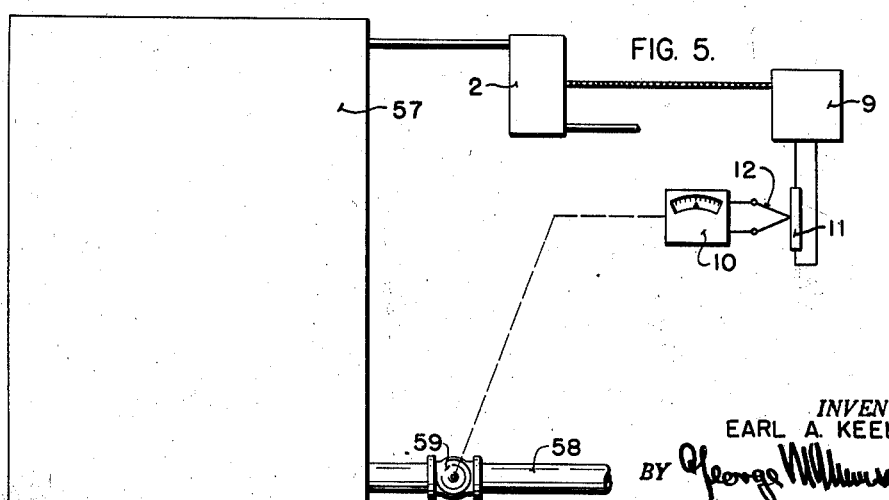
INVENTOR.
EARL A. KEELER
BY
ATTORNEY.

Patented Feb. 7, 1939

2,146,300

UNITED STATES PATENT OFFICE 2,146,300

THERMAL CONDUCTIVITY GAS ANALYSIS APPARATUS

Earl A. Keeler, Norristown, Pa., assignor to The Brown Instrument Company, Philadelphia, Pa., a corporation of Pennsylvania Application March 31, 1938, Serial No. 199,120

12 Claims. (Cl. 73—51)

The present invention relates to instrumentalities useful in determining the thermal conductivity of a fluid, and particularly that of a gas.

A general object of the invention is to provide a rugged measuring and/or controlling instrument of the type referred to above which is characterized by its simplicity and effectiveness, and may be operated directly from a commercial source of alternating current.

A further and more specific object of the invention is to provide a measuring and/or controlling instrument of the character described above in which a device carrying a contact moves towards and away from a predetermined position, in which said contact is in chattering engagement with a relatively fixed contact, responsively to variations in the thermal conductivity of the gas under measurement, and a measure of the composition of the gas is had by ascertaining the force necessary to restore and maintain said device in said predetermined position.

A further specific object of the invention is to provide an instrument of the type referred to above in which the maximum current flow required between the instrument contacts referred to is an extremely small value whereby arcing and sticking of the contacts will be a minimum.

Another specific object of the invention is to provide an instrument of the type referred to above which, although responsive to feeble control currents, is adapted to operate a relatively rugged exhibiting element.

A still further specific object of the invention is to provide an instrument of the type referred to above which is particularly adapted for use in commercial installations where it is desired to locate the exhibiting element at a point remote from the measuring elements.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Figs. 3 and 4 illustrate modifications of the arrangement of Fig. 1; and

Fig. 5 is a diagrammatic representation of the use of the invention in a control system.

Figure 1:
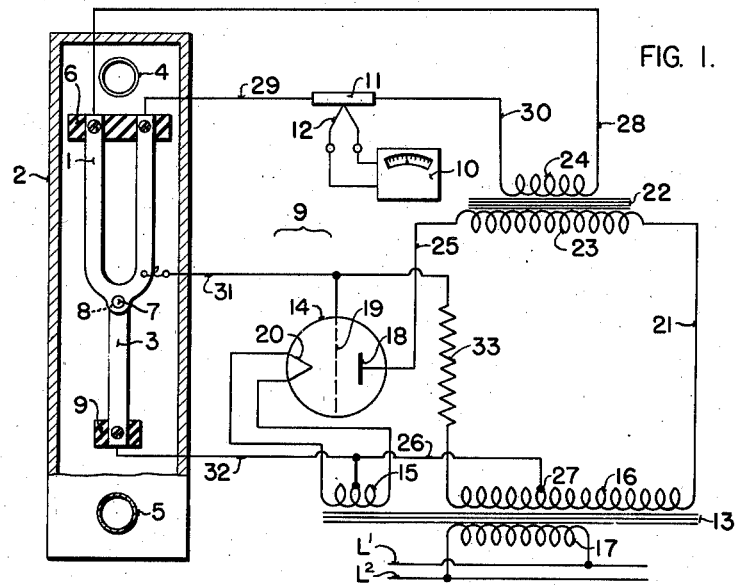
Fig. 1 is a diagrammatic representation of one embodiment of the invention.

The embodiment of my invention illustrated in Fig. 1 of the accompanying drawings comprises an instrument for measuring and exhibiting the composition of a gas responsively to the warping of a thermostatic device 1 having the property of warping to an extent determined by the temperature to which it is subjected. In accordance with this embodiment of my invention, the test gas is withdrawn from the atmosphere under test and passed continuously through a casing or cell 2 which houses the thermostatic device 1 and an associated thermostatic device 3 which is provided for compensating for ambient temperature changes. The test gas preferably enters the cell through an opening 4 at the top of the cell and comes out through an opening 5 at the bottom.

The devices 1 and 3 are each composed of two metals having different temperature coefficients of expansion which are welded, riveted, or soldered together along their entire length. Such devices are commonly known as bimetallic elements and have the property of changing their shape, or warping, in accordance with changes in the temperature to which they are subjected.

Figure 2:
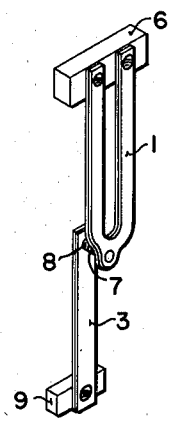
Fig. 2 illustrates in detail the gas responsive element of Fig. 1.

The device 1 may desirably be formed into a hairpin shape, as illustrated in detail in Fig. 2, and is rigidly secured at its open end to an insulating block 6 which is mounted in any convenient manner to the housing 2. The other end of device 1 carries a contact 7 which is adapted to move into and out of engagement with a contact 8, carried by the device 3 at its free end, as the temperature of the device 1 becomes greater or less than a predetermined value responsively to changes in the cooling effect of the test gas resulting from changes in gas composition. The device 3 is rigidly secured to an insulating block 9 connected in any suitable manner to the housing 2 and is provided for compensating for changes in ambient temperature so that on a change in ambient temperature the relative positions of the contacts 7 and 8 will not be changed and the instrument will be responsive to changes in gas composition only.

In referring to a temperature of device 1 of "predetermined value", I contemplate a value which is automatically and continuously reset and is desirably reset through the action of the measuring apparatus itself. For example, on a change in composition of the test gas and a consequent change thereof in its cooling effect on the device 1, the latter warps in one direction or the other to bias the contact 7 into or out of engagement with the device 8, and as a result of such engagement or disengagement, the temperature of the device 1 is varied in one direction or the other by means under control of said contacts and described hereinafter, to thereby effect the return of said device to its normal positional relation with the device 3.

The positional relation that normally exists between the devices 1 and 3 is such that the contacts 7 and 8 are in chattering engagement so that normally the periods during which the device 1 is successively actuated for movement in opposite directions are so brief that the device 1 is given no movement of significant extent. Upon the occurrence of a change in the thermal conductivity of the test gas, however, the engagement or disengagement of the contacts 7 and 8 is sustained for a longer period whereby the device 1 will be actuated in the proper direction to restore the normal positional relation between the devices 1 and 3.

The means referred to above for varying the temperature of the device 1, and thereby actuating the latter for movement in a direction to restore the contacts 7 and 8 into chattering engagement, utilizes the electrical resistance of the device 1 to the flow of current therethrough for producing a heating effect in said device and includes an electronic amplifier 9 which is under control of the contacts 7 and 8 and is adapted to supply current to said device. In an alternative arrangement a heating coil supplied current by the amplifier 9 and positioned in close proximity to the device 1 may be provided for heating the latter.

When the contacts 7 and 8 are in engagement, amplifier 9 is adapted to supply a predetermined value of current to the device 1, but when the contacts are out of engagement, the current supplied the device 1 is materially reduced and may even assume a zero value. The device 1 is so arranged that when current is supplied to it, it warps in a direction to separate the contacts 7 and 8, and conversely when the supply of current to it is reduced, it is permitted to cool and warps in the opposite direction to bring the contacts into engagement.

As will be clearly apparent, the average current value required to maintain the device 1 in a position such that the contacts 7 and 8 are in chattering engagement will vary in accordance with the thermal conductivity of the gas under measurement, and in this embodiment of my invention, I obtain a measure of the thermal conductivity of the gas, and thereby of the composition of the gas, by measuring the average current value supplied the device 1 by means of a meter 10. As illustrated, the current to be measured by the meter 10 is passed through a resistor element 11 and the heat produced in the resistance element generates a voltage in a thermocouple 12, the terminals of which are connected to the meter 10, which actuates the meter and causes deflection of its deflecting element to an extent determined by the magnitude of the current passing through the resistance element 11.

Meter 10 may be a thermocouple ammeter, as shown, or may be a hot wire or other suitable type, and is preferably calibrated in terms of gas composition to thereby provide a direct indication of the composition of the gas passing through the test cell 2. It will be apparent the conductors connecting the terminals of the meter 10 to the amplifier 9 may be extended to any desired length thereby permitting the indication of the composition of the gas under measurement at a point remote from the test cell 2.

As illustrated, the amplifier 9 includes a transformer 13 and an electronic valve 14. The transformer 13 supplies power to the system and is a combination step-up and step-down transformer comprising a low voltage secondary winding 15, a high voltage secondary winding 16, and a line voltage primary winding 17 having its terminals connected to alternating current supply conductors $L^1$ and $L^2$.

The electronic valve 14 is shown as a triode type and includes an anode 18, a control grid 19, and a filament cathode 20. The low voltage transformer secondary winding 15 is connected to the filament cathode 20 and supplies energizing current thereto. Anode voltage is supplied valve 14 from the high voltage secondary winding 16 through a circuit which may be traced from the right hand terminal of the winding to a conductor 21, the primary winding 23 of a transformer 22, a conductor 25, the anode 18 and cathode 20 of valve 14, and a conductor 26 to a tap 27 on the transformer secondary winding 16. Transformer 22 is preferably a step-down transformer and includes a secondary winding 24 the terminals of which are connected in a circuit which may be traced from the right hand terminal of the winding to a conductor 28, the end of one prong of the device 1, and therethrough to the end of the other prong, a conductor 29, the resistance element 11, and a conductor 30 to the other terminal of the winding. It is noted the transformer 22 may be dispensed with if a separate heating coil is provided for heating the device 1 or if the resistance of the device 1 is made suitably high, in which case the output current of valve 14 may be supplied directly to such heating coil or to the device 1.

As referred to hereinbefore, the means for controlling the conductivity of valve 14 and thereby the heating of the device 1 includes the contacts 7 and 8. The contact 7 is connected by a conductor 31 to the control grid 19 of valve 14, and the contact 8 is connected by a conductor 32 to the cathode 20. When the contacts 7 and 8 are out of engagement, a potential of such polarity is impressed on the control grid 19 by a portion of the secondary winding 16 through a resistance 33 that the grid potential relative to the cathode potential is such that the conductivity of the valve is a minimum. The circuit employed for so biasing the control grid 19 may be traced from the left hand terminal of the transformer secondary winding 16 to the resistor 33 and therethrough to the control grid 19.

When the contacts 7 and 8 are in engagement, however, it will be noted the bias voltage provided by the secondary winding 16 is shunted out and the potential of the control grid 19 will then be raised to that of the cathode 20 and may even be swung slightly positive with respect to the cathode potential, and as a result, the current conducted by the valve will be materially increased.

Thus, when the gas passing through the cell 2 has a predetermined composition, the contacts 7 and 8 will be in chattering engagement and the supply of energizing current to the device 1 from the transformer 22 will be precisely that value required to maintain the contacts in chattering engagement. That is to say, the gas passing through the cell 2 will then conduct away exactly the same amount of heat as is being generated by the flow of current through the device 1, whereby the latter will be in such a position relative to the device 3 that the contacts 7 and 8 will be in chattering engagement.

On a change in composition of the gas passing through the cell, however, the thermal conductivity of the gas will change a corresponding amount and accordingly the amount of heat conducted away from the device 1 will be changed. On an increase in gas thermal conductivity, for example, the device 1 will cool and move toward the device 3 and thereby move the contact 7 into sustained engagement with the contact 8. As a result, the supply of energizing current to the device 1 will be increased and cause warping of the latter away from the device 3 and thereafter separation of the contacts 7 and 8. On such separation of the contacts, the supply of energizing current to the device 1 will be reduced and the latter will again move toward the device 3, and will soon come to rest at an equilibrium position in which the contact 7 is in chattering engagement with the device 8. In order to maintain the device 1 in this position with a gas of increased thermal conductivity passing through the cell 2, however, it will be noted a correspondingly increased supply of energizing current must be supplied the device 1, and as will be clear, the meter 10 may be calibrated in terms of gas composition to provide a direct indication of the composition of the gas passing through the cell. Similarly, on a decrease in thermal conductivity of the gas passing through the cell 2, the supply of energizing current to the device 1 must be reduced a corresponding amount until the contacts 7 and 8 are again in chattering engagement, and the passage of this reduced current through the meter 10 will provide a direct indication of the composition of the gas passing through the cell.

Figure 3:
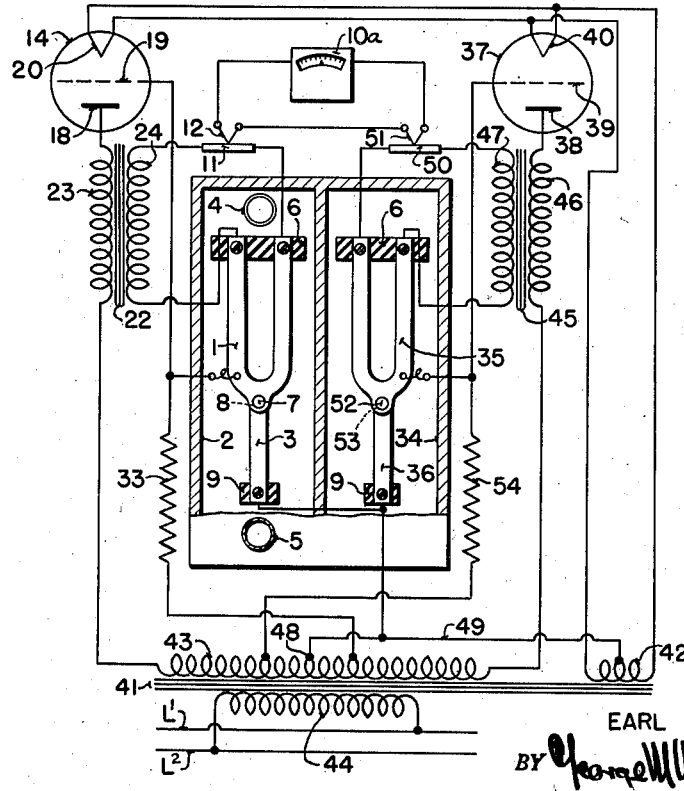

In Fig. 3 I have illustrated a modification of the arrangement disclosed in Fig. 1 in which the thermal conductivity of the gas passing through a test cell 2 is compared to that contained in a standard gas cell 34. In this modified arrangement, the test gas is withdrawn from the atmosphere under test and passed continuously through the test cell 2, and the standard gas in the other cell may be sealed in that cell. The test cell 2 includes a pair of bimetallic elements 1 and 3 which may be identical to the correspondingly identified parts of Fig. 1 and the standard cell includes a pair of bimetallic elements 35 and 36 which correspond respectively to the gas responsive and compensating elements of the test cell and may be identical therewith. The comparison method of Fig. 3 employing a standard cell and test gas cell is desirable for the purpose of compensating for changes in heat conductivity of the test gas with ambient temperature changes.

An electronic valve 14 is associated with the test cell 2 and an electronic valve 37 is associated with the standard cell 34. Valve 37 is preferably of the same type as the valve 14 and includes an anode 38, a control grid 39 and a filament cathode 40. The filament cathodes 20 and 40 of the valves are connected in parallel with each other and receive energizing current from the low voltage secondary winding 42 of a transformer 41. Transformer 41 includes a high voltage secondary winding 43, the low voltage secondary winding 42, and a line voltage primary winding 44 connected directly to the alternating voltage supply conductors $L^1$ and $L^2$.

Anode voltage is supplied the valves 14 and 37 from the high voltage secondary winding 43, and as seen in Fig. 3, the left hand terminal of the winding is connected to the anode 18 through the primary winding 23 of transformer 22, the right hand terminal of the winding is connected to the anode 38 through the primary winding 46 of a transformer 45, and a center tap 48 on the winding is connected by a conductor 49 to a center tap on the low voltage secondary winding 42 which supplies energizing current to the filament cathodes 20 and 40. Transformer 45 is preferably identical to the transformer 22 and includes the primary winding 46 and a secondary winding 47.

As shown the secondary winding 24 of the transformer 22 is connected in a series circuit with the device 1 and a resistance element 11, and the secondary winding 47 of the transformer 45 is connected in a series circuit with the device 35 and a resistance element 50. The resistance elements 11 and 50 are associated with a respective thermocouple 12 and 51 which are oppositely connected to the terminals of a meter 10a. That is to say, the voltage generated in the thermocouple 12 by the heat developed in the resistance 11 opposes the voltage generated in the thermocouple 51 by the heat developed in the resistance 50 so that when the opposed voltages are equal the deflection of meter 10a will be zero. Meter 10a is preferably of a zero center type and is desirably calibrated in terms of gas composition so that a direct indication of the composition of gas passing through the test cell may be had.

The conductivity of valve 14 is adapted to be controlled by the engagement and disengagement of the contacts 7 and 8 as described in connection with Fig. 1, and similarly the conductivity of valve 37 is adapted to be controlled by the engagement and disengagement of contacts 52 and 53 carried respectively by the devices 35 and 36. When the contacts 7 and 8 are out of engagement, a negative bias voltage is impressed on the control grid 19 through resistor 33 and when the contacts 52 and 53 are out of engagement, a negative bias voltage is impressed on the control grid 39 through a resistor 54. Engagement of the contacts 7, 8 or 52, 53 results in the negative bias voltage on the respective control grid being shunted out and consequently in an increased value of current being conducted by the corresponding valve.

Thus, when the heat conducted away by the gas passing through the test cell 2 is exactly the same as that conducted away by the gas in the standard cell, the contacts 7 and 8 of the test cell and the contacts 52 and 53 of the standard cell will be in chattering engagement and the conductivities of the valves 14 and 37 will be precisely the same whereby the deflecting element of the meter 10a will assume a zero position. On a change in the thermal conductivity of the gas passing through the test cell 2, however, the temperature of the device 1 and thereby the conductivity of valve 14 will change a corresponding amount, and the extent of the change in gas conductivity will be directly indicated by the meter 10a.

In Fig. 4, I have illustrated a modification of the disclosure of Fig. 3 in which the valves 14 and 37 do not directly supply energizing current to the devices 1 and 35 and to the heating resistors 11 and 50, but control the passage of energizing current to those elements. In this arrangement the devices 1 and 35 and the resistors 11 and 50 are connected in a series circuit with the transformer secondary windings 24 and 47, as shown. The point of connection of the devices 1 and 35 is connected by a conductor 55 to the alternating voltage supply conductor $L^1$ and the point of connection of resistors 11 and 50 is connected by a conductor 56 to the supply conductor L². Thus, depending on the impedance on the secondary winding 24 relative to that of the winding 47, the flow of energizing current to the device 1 will be more or less than that flowing through the device 35. The primary winding 23 is connected in the anode circuit of valve 14 and the primary winding 46 is connected in the anode circuit of valve 37, and the conductivities of these valves are controlled in the manner disclosed in the Fig. 3 arrangement so that on a change in thermal conductivity of gas passing through the test cell 2, the flow of current through winding 23 will change a corresponding amount.

It is noted the transformers 22 and 45 operate as saturating reactors in this arrangement, that is to say, on an increase in the flow of direct current through the primary winding 23, for example, the impedance of the secondary winding 24 is reduced, and as a result the flow of alternating current to the device 1 is increased. In other respects the operation of this arrangement is identical to that disclosed in Fig. 3 and needs no further description.

It will be apparent the apparatus of my present invention may be employed to operate a control valve or rheostat for controlling the composition of a gas responsively to the deflections of the deflecting element of the indicating meter 10 of Fig. 1 or 10a of Figs. 3 and 4. For example, as shown in Fig. 5, an enclosure 57, the composition of the atmosphere of which is being measured by the apparatus of Fig. 1, is supplied air or other gas from a pipe 58 through a valve 59, the adjustment of which is effected automatically in any well known manner by means responsive to the deflection of the deflecting element of the meter 10 from a predetermined position. The mechanical connection of the valve 59 to the automatic adjusting means referred to is such as to increase and decrease the supply of air to the enclosure 57 as the composition of the gas under measurement drops below or rises above a predetermined value.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Apparatus for determining the composition of a gas including a casing through which said gas is passed, a temperature responsive device contained in said casing, a contact controlled by said device, a relatively fixed contact associated with said first mentioned contact and adapted to be engaged thereby, means under control of said contacts for heating said device, and registering means connected in circuit with said heating means.

2. Apparatus for determining the composition of a gas including a casing through which said gas is passed, a temperature responsive device located in said casing and supported at one end and carrying a contact at its other end, a relatively fixed contact associated with said first mentioned contact and adapted to be engaged thereby, means under control of said contacts for heating said device, and registering means connected in circuit with said heating means.

3. Apparatus for determining the composition of a gas including a casing through which said gas is passed, an elongated device formed of metals having different temperature coefficients of expansion and supported at one end and carrying a contact at its other end, a relatively fixed contact associated with said first mentioned contact and adapted to be engaged thereby, means under control of said contacts for heating said device, and registering means connected in circuit with said heating means.

4. Apparatus for determining the composition of a gas including a casing through which said gas is passed, an elongated device formed of metals having different temperature coefficients of expansion and supported at one end and carrying a contact at its other end, a relatively fixed contact associated with said first mentioned contact and normally in chattering engagement therewith, means adapted on movement of said device from the position in which said contacts are in chattering engagement to return said device to that position, registering means, and means under control of said contacts to control said first mentioned means and said registering means.

5. Apparatus for determining the composition of a gas including a casing through which said gas is passed, a second casing containing a standard gas, each of said casings including an individual elongated temperature responsive device supported at one end and carrying a contact at its other end, relatively fixed contacts associated with each of said first mentioned contacts and normally in chattering engagement therewith, means adapted on movement of each of said devices from the position in which said contacts are in chattering engagement to return the device associated therewith to that position, means individual to each of said devices and under control of a respective pair of contacts to control the said first mentioned means, and registering means connected in circuit with said second mentioned means.

6. Apparatus for determining the composition of a gas including a casing through which said gas is passed, a second casing containing a standard gas, each of said casings including an individual elongated temperature responsive device supported at one end and carrying a contact at its other end, relatively fixed contacts associated with each of said first mentioned contacts and normally in chattering engagement therewith, individual means adapted on movement of each of said devices from the position in which said contacts are in chattering engagement to return the device associated therewith to that position, said last mentioned means including means individual to each of said devices and under control of a respective pair of contacts, and registering means connected in circuit with said last mentioned means.

7. Apparatus for determining the composition of a gas including a casing through which said gas is passed, a temperature responsive device contained in said casing, a contact controlled by said device, a relatively fixed contact associated with said first mentioned contact and adapted to be engaged thereby, means for heating said device including electronic valve means under control of said contacts, and registering means connected in circuit with said heating means.

8. Apparatus for determining the composition of a gas including a casing through which said gas is passed, an elongated device formed of metals having different temperature coefficients of expansion and supported at one end and carrying a contact at its other end, a relatively fixed contact associated with said first mentioned contact and adapted to be engaged thereby, means for heating said device including electronic valve means under control of said contacts, and registering means connected in circuit with said heating means.

9. Apparatus for determining the composition of a gas including a casing through which said gas is passed, an elongated device formed of metals having different temperature coefficients of expansion and supported at one end and carrying a contact at its other end, a relatively fixed contact associated with said first mentioned contact and normally in chattering engagement therewith, means adapted on movement of said device from the position in which said contacts are in chattering engagement to return said device to that position, registering means, and electronic valve means under control of said contacts to control said first mentioned means and said registering means.

10. Apparatus for determining the composition of a gas including a casing through which said gas is passed, a second casing containing a standard gas, each of said casings including an individual elongated temperature responsive device supported at one end and carrying a contact at its other end, relatively fixed contacts associated with each of said first mentioned contacts and normally in chattering engagement therewith, means adapted on movement of each of said devices from the position in which said contacts are in chattering engagement to return the device associated therewith to that position, electronic valve means individual to each of said devices and under control of a respective pair of contacts to control the said first mentioned means, and registering means connected in circuit with said valve means.

11. Apparatus for determining the composition of a gas including a casing through which said gas is passed, a second casing containing a standard gas, each of said casings including an individual elongated temperature responsive device supported at one end and carrying a contact at its other end, relatively fixed contacts associated with each of said first mentioned contacts and normally in chattering engagement therewith, individual means adapted on movement of each of said devices from the position in which said contacts are in chattering engagement to return the device associated therewith to that position, said last mentioned means including an electronic valve individual to each of said devices and under control of a respective pair of contacts, and registering means connected in circuit with each of said valves.

12. Apparatus for determining the composition of a gas including a casing through which said gas is passed, a second casing containing a standard gas, each of said casings including an individual elongated temperature responsive device supported at one end and carrying a contact at its other end, relatively fixed contacts associated with each of said first mentioned contacts and normally in chattering engagement therewith, individual means adapted on movement of each of said devices from the position in which said contacts are in chattering engagement to return the device associated therewith to that position, said last mentioned means including a saturable reactor and an electronic valve, under control of a respective pair of contacts, individual to each of said devices, and registering means connected differentially to said saturable reactors.

EARL A. KEELER.